United States Patent [19]

Zipperle

[11] Patent Number: 4,505,965
[45] Date of Patent: Mar. 19, 1985

[54] RAIN PROTECTIVE MOLDING FOR AUTOMOBILES

[76] Inventor: Wolfgang Zipperle, Favoritegarten 46, Ludwigsburg, Fed. Rep. of Germany

[21] Appl. No.: 393,375

[22] Filed: Jun. 29, 1982

[30] Foreign Application Priority Data

Jul. 10, 1981 [DE] Fed. Rep. of Germany ....... 3137307

[51] Int. Cl.³ .......................... B60R 9/04; E06B 7/14
[52] U.S. Cl. .................................... 428/122; 49/476; 49/490; 428/358
[58] Field of Search .................... 428/31, 122, 358; 49/476, 490, 496

[56] References Cited

U.S. PATENT DOCUMENTS

| | | | |
|---|---|---|---|
| 2,686,691 | 8/1954 | Burrell | 49/490 X |
| 3,333,381 | 8/1967 | Stark et al. | 49/490 X |
| 3,706,628 | 12/1972 | Azzola | 428/122 X |
| 3,927,493 | 12/1975 | Tsuneishi et al. | 49/476 |
| 4,292,354 | 9/1981 | Katoh | 428/122 X |
| 4,374,880 | 2/1983 | Mesnel | 428/122 X |

FOREIGN PATENT DOCUMENTS 2065210  6/1981  United Kingdom ................ 428/122

Primary Examiner—Henry F. Epstein
Attorney, Agent, or Firm—Hopgood, Calimafde, Kalil, Blaustein & Judlowe

[57] ABSTRACT

A rain molding strip for attachment to the rain gutter of a vehicle, particularly an automobile. The molding strip is molded as a single integral piece from polymeric material such as rubber or plastic and particularly polyurethane foam. Embedded within the rain gutter are shaped metal strips for facilitating attachment of the molding strip to the gutter of the car as well as facilitating the attachment of external devices such as luggage racks to the rain molding itself. Integrally molded with the strip are a series of lips and sealing members at those positions where such additions are needed. A method for producing the strip is also disclosed.

10 Claims, 4 Drawing Figures

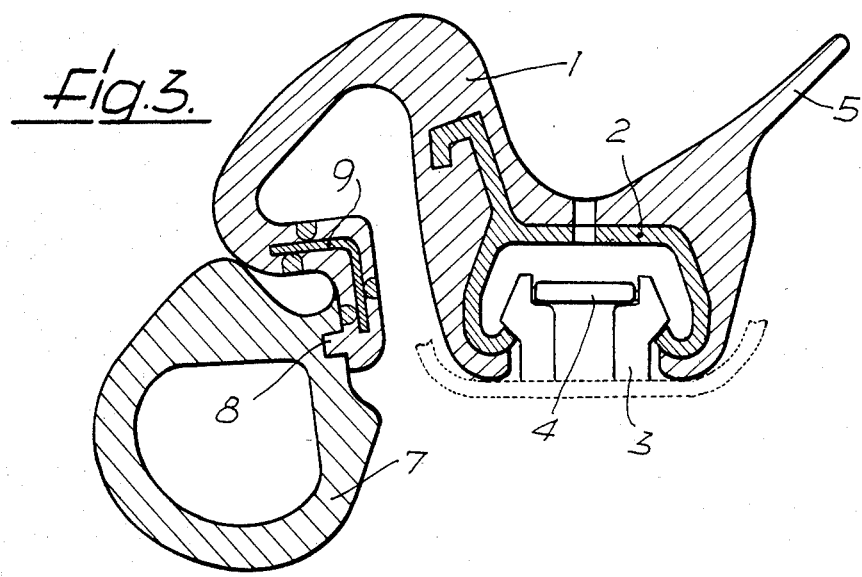
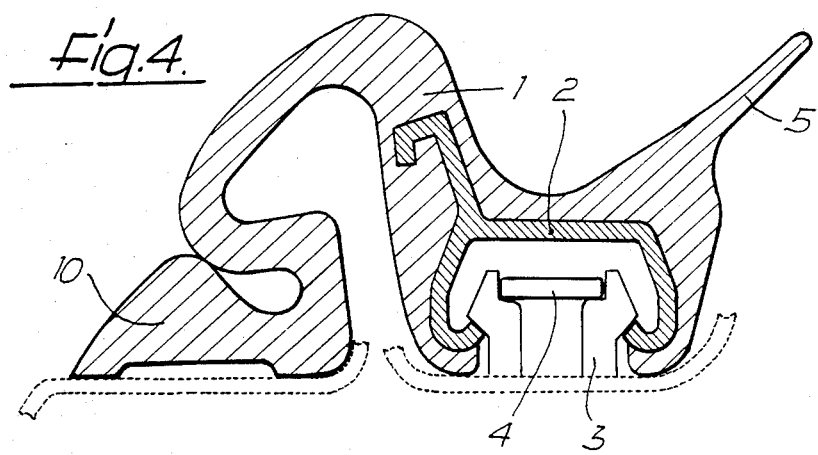

RAIN PROTECTIVE MOLDING FOR AUTOMOBILES

BACKGROUND OF THE INVENTION

This invention relates generally to rain molding strips for vehicles, particularly automobiles. Rain molding strips for automotive vehicles are ordinarily contoured strips of metal or plastic having a coating which imparts a metallic appearance to them. The contoured shape must be substantially adapted to the shape of the rain gutter so that the possibility for variation in the shape of the molding strip or its appearance is very limited.

SUMMARY OF THE INVENTION

The object of the present invention is to provide a rain molding strip for automotive vehicles which permits a greater freedom in construction. This object is achieved by a rain molding strip having the features set forth in the claims.

The cross-section of a strip of rubber or plastic, for example polyurethane foam, can be freely selected within a wide range. It is therefore possible to provide a lip thereon which forms, with the roof or a lengthwise member of the body, a deep water-discharge gutter to prevent water from being driven out of the gutter by the wind and splattering onto the windows while the vehicle is moving. Because of the fact that the lip is integral with the body of the strip, there is no danger of it being torn off. For example, in a car wash a danger of the lip being torn off would exist if the strip body and the lip were to consist of rubber and the lip had to be vulcanized onto the strip body. This construction would also be substantially more expensive than the manufacture of the rain molding strip in accordance with the invention. The appearance of the rain molding strip of the invention can be varied within a wide range since not only its color but also the configuration of its surface can be freely selected. For instance, the surface can readily be provided with graining. The embedded metal strip or strips prevent shrinkage of the body of the strip as well as preventing cold flow, so that the rain molding strip of the invention is dimensionally stable in the same manner as known molding strips. Other advantages of the rain molding strip of the invention are its light weight, the avoidance of steps or shoulders when viewed in the longitudinal direction and, in particular, its inexpensive manufacture, including the one-piece construction of the body of the strip and the lip or other parts thereof.

The metal strip which is embedded in the body of the molding strip is preferably a shaped aluminum strip. In a preferred embodiment, the metal strip lies in the part of the molding strip body which lies within the rain gutter. It can also serve to attach the rain molding strip to the rain gutter. The attachment is particularly simple if the metal strip has a C-shaped cross-section which is open towards the gutter and if the channel, defined by this strip and open towards the gutter, is free of the material which forms the covering. In such instances, the attachment elements which protrude from the gutter can directly engage the metal strip and thereby fasten the latter in position.

It is particularly advantageous for the metal strip to have a cross-section including an arm which extends into the part of the strip body which extends around the gutter, since this arm can then absorb compressive forces such as those occurring when a roof luggage rack is attached. If the strip body completely surrounds the gutter and therefore abuts it along its outer side, it is advisable to provide an additional metal strip in the portion of the strip body resting against the gutter, at least in those sections which are to be used for the attachment of a roof luggage rack. The additional strip is also embedded in the strip body.

In order that the user may see where he can clamp a roof luggage rack, which is important not only when the additional metal strip does not extend over the entire length of the body but also with respect to distribution of weight, the strip body can be provided with suitable markings. For example, the marking can be in the form of depressions in the body.

At the place where the rain molding strip extends along a door, a seal is necessary, which is formed by a tubular rubber member. In order that the connection between the strip body and the sealing body be reliable even if it is attached by adhesives, the strip body and the sealing body are preferably provided with inter-engaging connecting elements, for example, a tongue and groove connection.

In this manner, an increase in the size of the adherent surface is also obtained, which also increases the load-carrying capacity of the connection.

In order to avoid the necessity of cutting and partially removing the sealing body where no sealing is necessary, in a preferred embodiment, a filler body is formed onto the body of the strip in the section or sections in which no sealing body or no complete sealing body is required. The filling body supplements the body of the strip to the desired extent. By the insertion or removal of force plugs upon molding, the filler body can be adapted in a simple manner to the different requirements of, for example, two-door and four-door cars.

BRIEF DESCRIPTION OF THE DRAWINGS

The invention will be described below in detail with reference to an embodiment shown in the drawing, in which:

FIG. 3 is a section along the line III—III of FIG. 1,

FIG. 4 is a section along the line IV—IV of FIG. 1.

DESCRIPTION OF THE PREFERRED EMBODIMENTS

A rain molding strip for covering the rain gutter G of a passenger car has an elongated molded body 1 of a polymer such as rubber or plastic and particularly of polyurethane foam, which extends over the entire length of the rain molding strip and is formed as a single integral piece.

Figure 1:
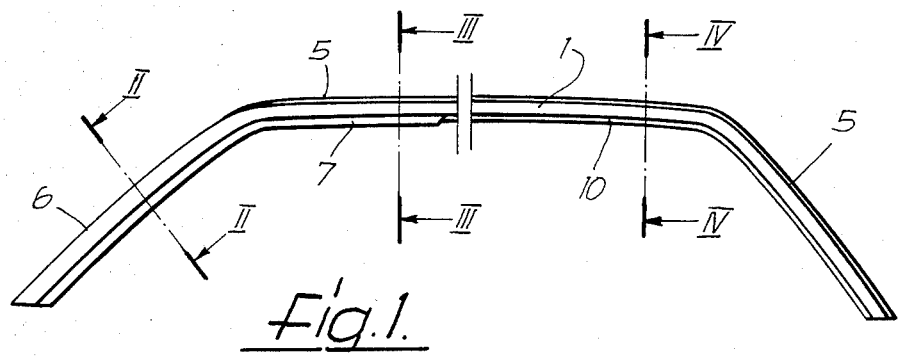
FIG. 1 is a side view of the embodiment of the invention.
Figure 2:
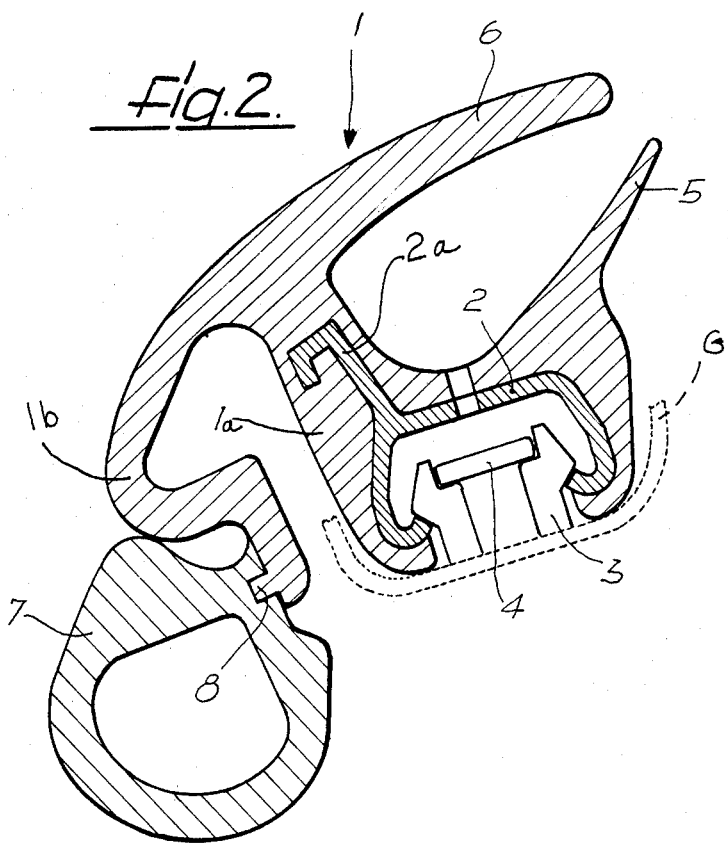
FIG. 2 is a section along the line II—II of FIG. 1.

As shown in FIGS. 2 to 4, the central portion of the cross section of body 1 adjacent rain gutter G has a C-shaped groove which is open towards the bottom of gutter G. Within this groove is a first aluminum shaped strip 2 which is embedded in body 1 and extends over its entire length. The portion of strip 2 which lies within the groove of the strip body 1 also has a C-shaped profile which is open towards gutter G. This cross-section makes it possible to readily connect the rain molding strip to gutter G. As shown, for instance, in FIG. 2, a connecting strip 3 is fastened, in the embodiment shown, to the bottom of gutter G by fastening elements 4. Connecting strip 3 has a cross-section which engages strip 2 and extends over its free ends. In order to connect the rain molding strip to the gutter G, body 1 together with strip 2 is pushed over connecting strip 3.

As shown in FIGS. 2 to 4, a thin lip 5 protruding obliquely outwardly and upwardly is formed on the central portion of body 1. Lip 5 rests against the inner flank of gutter G formed by the roof or post.

A side part 1a which engages the edge of gutter G and also rests against its side is formed on the opposite side of the central section of the cross-sectional profile of body 1. Side part 1a terminates, in the embodiment shown, at approximately the height of the bottom of gutter G. In the region of transition between the central part and side part 1a of the body 1 and, therefore, at the place where body 1 lies along the free arm of gutter G, an arm 2a of the aluminum strip 2 is embedded in body 1. Arm 2a extends obliquely outwardly and upwardly from the C-shaped part and has a pair of right angle bends at its free end, thus forming a U-shaped cross-section which is open towards the bottom. Arm 2a of aluminum strip 2 serves, in the same manner as the C-shaped part, to prevent shrinkage of body 1. In addition, when a roof luggage rack is clamped to gutter G arm 2a prevents cold flow of body 1 due to the force exerted on it by the roof luggage rack.

As shown in FIG. 2, a second, relatively long lip 6 is formed along the side portion of body 1 on that part of its length which extends along the front roof post. Lip 6 is formed integrally with body 1 and extends from the concavely curved zone which extends above the upper edge of the free arm of gutter G towards the wall against which lip 5 rests. Accordingly, lip 6, together with the central part of body 1 and lip 5, forms a large U-shaped channel which is open only in the region of the free ends of lips 5 and 6. Lip 6, therefore, prevents the water which discharges into the channel formed by the central portion of body 1 and lip 5 from being driven out by wind and blown against the windows of the automobile upon movement of the vehicle. Since this problem only exists in the region of the front post, lip 6 ends adjacent to the upper end of the front door post. This can be noted from FIGS. 3 and 4 which show sections through the rain molding strip in the horizontally extending region, i.e., the region which extends along the automobile roof.

A sealing body 7 of tubular shape, formed of silicone rubber lies along an arm 1b of body 1 along that part of body 1 which extends along the front door post and the upper edge of the door or doors. Sealing body 7 is bonded to arm 1b of body 1. In order to reinforce the attachment, sealing body 7 is provided, on the surface resting against arm 1b, with a groove which is open towards the surface and into which a protruding tongue 8 of arm 1b interengages.

In those sections of the strip body 1 along which a roof luggage rack can be placed, a second aluminum contoured strip 9 is embedded, in arm 1b of body 1, as shown in FIG. 3. Aluminum strip 9 lies, in the embodiment shown, not only within the part of arm 1b of body 1 which rests on the outside against gutter G but also, due to the shape of arm 1b, within the adjoining section of arm 1b which protrudes outwards from the rain strip. Second strip 9 is therefore a angle iron. In the same way as arm 2a, which protrudes from the C-shaped portion of first aluminum strip 2, the second strip 9 prevents cold flow of body 1 under the force which is exerted upon it by a roof luggage rack. The clamping device which clamps the roof luggage rack to gutter G engages from the outside between body 1 and sealing body 7, it thereby presses arm 1b against the free arm of gutter G.

In order to avoid the necessity of notching and cutting sealing body 7 at places where its entire cross-section is not required, a filler body 10 which lies parallel to strip body 1 adjoins sealing body 7. Filler body 10 is constructed of polyurethane foam, like body 1, and is joined to arm 1b of the latter in the same was as sealing body 7 along the outwardly facing side of arm 1b. As shown in FIG. 4, filler body 10 has a cross-section similar to the upper portion of sealing body 7, i.e., as that part which would remain if the sealing body 7 were cut and partially removed. The advantage of filler body 10, however, is not merely that the cutting of sealing body 7 is dispensed with, but that it also prevents the presence of porous regions, such as would occur if the sealing body 7 were cut.

As a rule, the individual sections of a rain molding strip must have a curved course. In order to eliminate the use of a mold, such as an injection mold, in which the elongated cavity already has the curved course which the final rain molding strip is to have, one can also start from a metal strip which lies in a plane over its entire length or part of its length. In order to produce the molding strip, this metal strip is placed in a mold whose elongated cavity has only those curvatures which lie in the plane of the metal strip or only a portion of the curvatures which extend from this plane. Such a mold is substantially more economical than a mold in which the elongated cavity has the same course as the rain molding strip has when ready for attachment, i.e., is curved in three dimensions. The individual portions of the rain molding strip are then bent into final shape after removal from the mold. Due to the stresses which occur during the bending and which may be disturbing particularly in case of large temperature variations, sharp curvatures cannot be produced by bending the strip after removal from the mold.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

I claim:

1. A rain molding strip for attachment to the rain gutter of a vehicle, comprising an elongated body molded of a polymer material, said elongated body being in a single piece over its entire length, said elongated body having at least one metal reinforcing strip embedded thereon, said reinforcing strip being disposed proximate said gutter of said vehicle, said elongated body having at least first and second cross-sectional profiles disposed at first and second portions of said elongated body, said first and second profiles being different in configuration, and said elongated body including at least one obliquely projecting lip which is integrally molded therewith to abut a portion of said rain gutter and said obliquely projecting lip extending over the length of said rain molding strip, said cross-sectional profile of said first portion of said elongated body being a U-shaped rain channel, one flank of said U-shaped channel being formed by said obliquely projecting lip, and elongated body including an arm forming the base of said U-shaped channel and a second tip extending from said arm and disposed generally parallel to said obliquely projecting lip forming the other flank of said U-shaped channel, said cross-sectional profile of said second portion of said elongated body being formed by the absence of a portion of said second lip.

2. A rain molding strip as claimed in claim 1, wherein a shaped aluminum strip comprises said metal strip.

3. A rain molding strip as claimed in claim 1, wherein said metal strip has a C-shaped cross-section which is open towards said rain gutter and the channel defined by said C-shaped cross-section is free of said molded, polymer material.

4. A rain molding strip as claimed in claim 1, wherein said metal strip includes an arm extending into said arm of said elongated body which forms the base of said rain gutter.

5. A rain molding strip as claimed in claim 1, wherein said polymer material comprises polyurethane foam.

6. A rain molding strip as claimed in claim 1, wherein a second metal strip is embedded in that region of said strip body which rests against the outside of said rain gutter.

7. A rain molding strip as claimed in claim 6, wherein said second metal strip is disposed in those portions of said elongated body which are intended for the attachment of a roof luggage rack.

8. A rain molding strip as claimed in claim 7, wherein said portions of elongated body which are intended for the attachment of a roof luggage rack are provided with marking indicia to permit the user to position said luggage rack.

9. A rain molding strip as claimed in claim 1 further including a tubular sealing body disposed alongside at least a portion of said elongated body, said elongated body and said sealing body including inter-engaging tongue and groove attaching elements.

10. A rain molding strip as claimed in claim 1, further including a filler member molded integrally with said elongated body, said filler member being disposed alongside elongated body in that section of said elongated body in which a further sealing element is not required.

* * * * *

UNITED STATES PATENT AND TRADEMARK OFFICE
CERTIFICATE OF CORRECTION

PATENT NO. : 4,505,965
DATED : March 19, 1985
INVENTOR(S) : Wolfgang Zipperle

It is certified that error appears in the above—identified patent and that said Letters Patent is hereby corrected as shown below:

IN THE CLAIMS:

Column 4, claim 1, line 53, "thereon" should be -- therein --;

Column 4, claim 1, line 66, "and" should be -- said --; and

Column 4, claim 1, line 67, "tip" should be -- lip --.

Signed and Sealed this

Ninth Day of July 1985

[SEAL]

Attest:

DONALD J. QUIGG

Attesting Officer   Acting Commissioner of Patents and Trademarks